United States Patent [19]

Lemelson

[11] Patent Number: 5,408,536
[45] Date of Patent: Apr. 18, 1995

[54] MACHINE SECURITY SYSTEMS

[76] Inventor: Jerome H. Lemelson, Suite 286, Unit 802 930 Tahoe Blvd., Incline Village, Nev. 89451-9436

[21] Appl. No.: 232,470

[22] Filed: Apr. 22, 1994

Related U.S. Application Data

[63] Continuation of Ser. No. 10,614, Jan. 28, 1993, abandoned, which is a continuation of Ser. No. 633,305, Nov. 6, 1984, Pat. No. 5,202,929, which is a continuation of Ser. No. 192,460, Sep. 30, 1980, abandoned, which is a continuation-in-part of Ser. No. 78,167, Sep. 24, 1979, abandoned.

[51] Int. Cl.⁶ ............................................. G06K 9/00
[52] U.S. Cl. .................................. 382/2; 340/825.31; 340/825.34
[58] Field of Search .................... 382/2, 3, 4; 381/42; 235/382, 283; 340/825.31, 825.34

[56] References Cited

U.S. PATENT DOCUMENTS

| | | | |
|---|---|---|---|
| 2,914,746 | 11/1959 | Jones | 358/108 |
| 3,466,394 | 9/1969 | French | 179/15 B |
| 3,665,160 | 5/1972 | Lopata | 235/61.1 |
| 3,673,331 | 6/1972 | Hair et al. | 179/15 B |
| 3,678,192 | 7/1972 | Akuta | 358/107 |
| 3,693,166 | 9/1972 | Rawson et al. | 364/200 |
| 3,803,350 | 4/1974 | Lemelson | 358/903 |
| 3,805,238 | 4/1974 | Rothfjell | 340/146.3 E |
| 3,872,443 | 3/1975 | Ott | 364/900 |
| 3,886,173 | 2/1975 | Moorman et al. | 340/149 A |
| 3,889,056 | 6/1975 | Mayer | 358/93 |
| 3,943,563 | 3/1976 | Lemelson | 360/35 |
| 4,001,499 | 1/1977 | Dowell | 358/109 |
| 4,020,463 | 4/1977 | Himmel | 382/21 |
| 4,051,524 | 9/1977 | Baxter | 358/108 |
| 4,084,198 | 4/1978 | Lemelson | 360/33 |
| 4,114,027 | 9/1978 | Slater et al. | 235/419 |
| 4,118,730 | 10/1978 | Lemelson | 358/93 |
| 4,148,061 | 4/1979 | Lemelson | 358/101 |
| 4,198,656 | 4/1980 | Alathisen | 358/108 |
| 4,210,899 | 7/1980 | Swonger et al. | 340/146.3 E |
| 4,213,163 | 7/1980 | Lemelson | 360/35 |
| 4,237,483 | 12/1980 | Clever | 358/108 |
| 4,246,568 | 1/1981 | Peterson | 340/146.3 E |
| 4,283,710 | 8/1981 | Genest et al. | 340/149 R |

OTHER PUBLICATIONS

K. E. Powell, "Automated Video Monitoring System," *IBM Technical Disclosure Bulletin*, vol. 18, No. 7, Dec. 1975, pp. 2280-2281.

Beek, et al., "Speaker Authentication and Voice Data Entry," *21st Midwest Symposium on Circuits and Systems* (Aug. 14-15, 1978).

*Primary Examiner*—Joseph Mancuso
*Attorney, Agent, or Firm*—Steven G. Lisa; Peter C. Warner

[57] ABSTRACT

A system and method are provided for enabling and recording operations relating to machines such as computers. In particular, the invention involves electronic means for sensing or scanning one or more physical characteristics of a person or persons about to enter and/or receive data from a computer and generating signals indicative of such physical characteristic(s), which signals are automatically analyzed and compared with signals stored in a memory to generate enabling signals for enabling the operation of the machine. In a particular form of the invention, both the presence of a person at a computer terminal and an identifying characteristic of such person are sensed and used to enable the operation of the machine and the entry and retrieval of data.

26 Claims, 2 Drawing Sheets

MACHINE SECURITY SYSTEMS

STATEMENT OF RELATED APPLICATIONS

This is a continuation of application Ser. No. 08/010,614, filed Jan. 28, 1993, abandoned, which is a continuation of application Ser. No. 06/633,305, filed Nov. 6, 1984, now U.S. Pat. No. 5,202,929, which is a continuation application Ser. No. 06/192,460, filed Sep. 30, 1980, now abandoned, which is a continuation-in-part of Ser. No. 06/078,167, filed Sep. 24, 1979, now abandoned.

SUMMARY OF THE INVENTION

This invention relates to a system and method for improving the operation of computers and computing systems, particularly with respect to the security and confidentiality of information contained and entered therein.

A number of major problems exist in the operation of computers and computing systems. One of such problems involves the unauthorized attainment of data from the computer or computing system. Another problem is involved with the entry of data into a computer or memory associated with a computing system, which data is either incorrect due to an operator's error or is false as a result of an attempt to commit fraud and falsify records.

The instant invention is concerned with a computer system in which fraud is substantially reduced or, if permitted, may be easily detected as to its source. The system also provides for means for assuring that confidential data stored therein is available only to persons authorized to view or receive same.

A primary feature of the instant invention involves the identification of all persons who enter data into a computer and preferably, although not necessarily, all persons who receive data from the computer or, in a specialized form, all persons who receive confidential data from the computer. Such identification may be effected in a number of ways, including the automatic electronic recognition of a particular feature of the person about to enter or receive data with respect to the computer or computer memory. Such recognition may be effected by (1) the electronic analysis of a person's voice signals generated when the person speaks into a microphone, (2) the automatic electro-optical scanning of a person's fingerprint presented by the person to a scanning location, (3) the automatic electro-optical or otherwise-effected scanning of the dimensions of a person's hand including the fingers thereof, (4) the electro-optical scanning of a person's face from one or more directions or the scanning of any other body feature of the person, wherein the analog signals derived from said scanning are digitized and are compared with signals derived from a memory that were originally recorded in such memory from signals derived in similar scans of the same person. Such identification results in the generation of a code signal, preferably from the computer memory, which is recorded in a temporary storage device such as on a magnetic disc or in an electronic memory, and the reproduction of such code signals from such storage device each time an entry is made by the operator into the computer or data is received from the computer or together with the information so recorded and/or a code signal or signals representative of the memory derived from the computer. The enabling signal or control, which permits data to be received or entered, may be periodically updated or refreshed in accordance with periodic checks of the identification of the person entering the data, which may be randomly or periodically indicated by a warning device requiring same or a sensing device that senses when such person leaves the vicinity of the terminal at which data is entered or requested.

In another form of the invention, data may be entered or requested by a person speaking words into a microphone at the computer terminal or remote therefrom and connected to the computer terminal by shortwave or telephone lines, wherein the voice signals of the person entering or requesting the data are automatically analyzed by the computer for identifying such person and generating an enabling signal as well as the identification code signal, which is recorded along with signals indicative of the information derived from and/or entered into the computer. Such automatic analysis may occur as the person speaks words indicative of information requested or to be answered.

In a particular form of the invention, two or more of the aforedescribed personal identification techniques may be employed and required for the entry or attainment of data or of specific data in the computer.

Accordingly, it is a primary object of this invention to provide a new and improved system and method for operating a computer or computing system.

Another object is to provide a system and method for operating a computer or computing system wherein identification of persons having access thereto and entering or receiving data with respect to the computer or its memory, is ascertained.

Another object is to provide a computer or computing system in which persons entering data into the system are identified and all transactions, including data entered and received, are identified and recorded as to the identification of the persons involved in such transactions.

Another object is to provide a computing system in which fraud in the entry of data is greatly reduced.

Another object is to provide a computer system in which confidential data stored in or retrieved from a computer, is only available to authorized persons.

Another object is to provide a computer system in which data is both entered and retrieved from the computer or its memory by the automatic analysis of speech signals generated by a person speaking into a microphone, which analysis results in identification of such person and the generation of a code that is applied as a recording to indicate the information derived from and entered into the computer, for record-keeping purposes.

Another object is to provide a computer security system in which the presence of a person is sensed at a terminal and the person is identified by sensing a physical characteristic of such person or by the person entering a code into the computer or auxiliary equipment wherein, if such person should leave the vicinity of the terminal, another person will not be able to operate the computer without further identification of such other person.

Another object is to provide a computer security system in which a record is made of the identity of all persons operating the computer and the information entered and received from the computer, whereby the source of data entered into the computer and retrieved therefrom may be identified for auditing purposes and control.

Another object is to provide a computer security system in which signals are recorded which positively identify persons who operate a computer or peripheral together with an indication of time of operation of the computer and information transferred.

With the above and such other objects in view as may hereinafter more fully appear, the invention consists of the novel constructions, combinations and arrangements of parts and method as will be more fully described and illustrated in the accompanying drawings, but it is to be understood that changes, variations and modifications may be resorted to, which fall within the scope of the invention as claimed.

DETAILED DESCRIPTION

Figure 1:
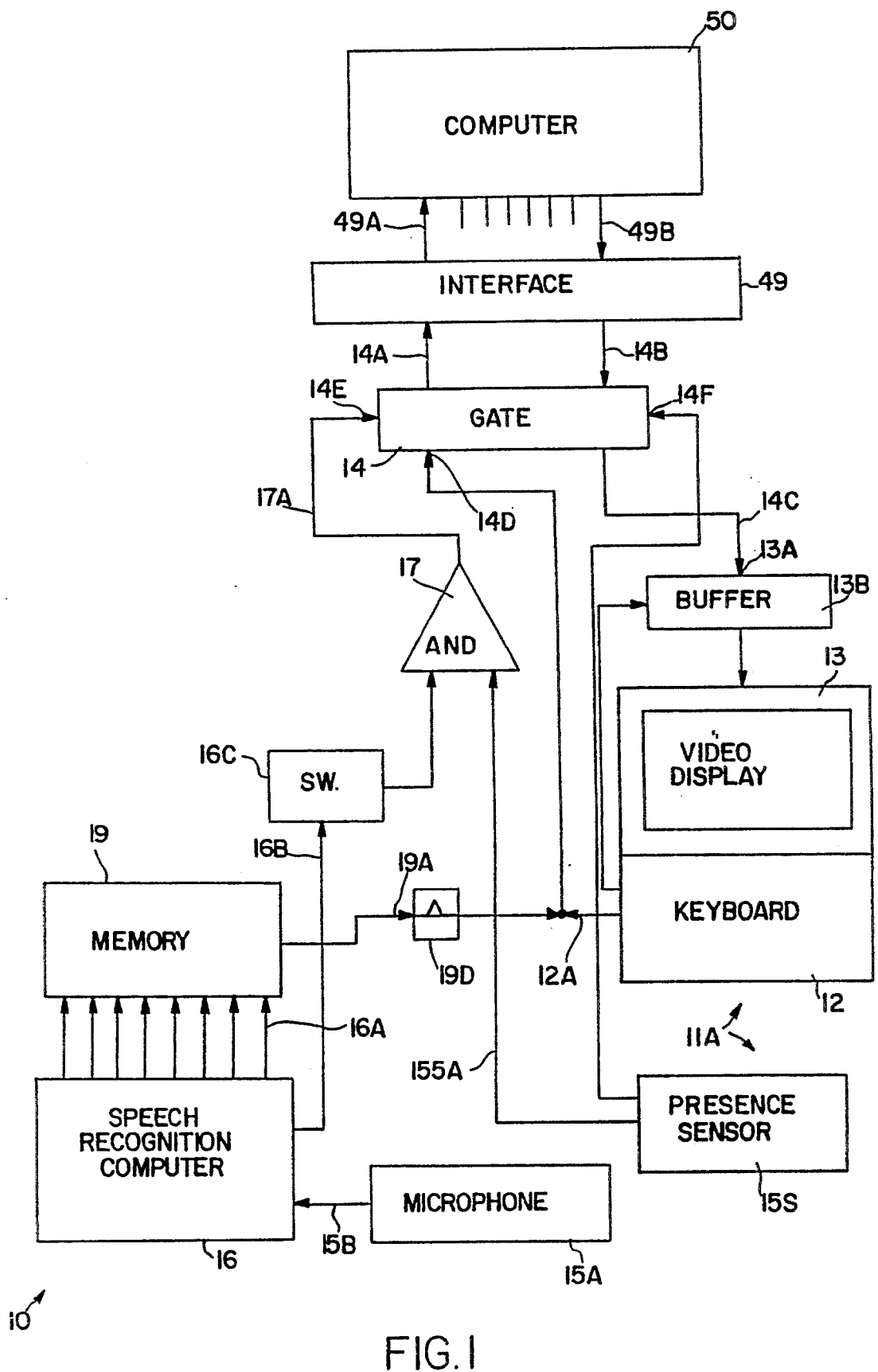
FIG. 1 is a schematic diagram showing features of the broad computer security and control system defining the instant invention.

FIG. 1 show broad aspects of a data processing system 10 that includes a data terminal 11A, and a computer 50. One or more of such terminals 11A may time share the computer 50 through interface 49 such as a time-sharing multiplexing system. The terminal 11A includes a coded keyboard 12 having an output 12A extending to a control gate or switch 14, which itself contains an output 14A extending to the interface or multiplexing device 49. The latter interface 49 contains one or more outputs 49A extending to the input or inputs of the computer 50, while the computer 50 contains one or more outputs 49B extending to the interface 49, which itself contains a plurality of outputs, one of which 14B extends to the gate 14, and an output 14C from such gate 14 extends to the input 13A of a memory or buffer 13B for an image writing display 13, which may comprise a conventional display cathode ray tube. Unless gate 14, which may contain one or more switches for enabling information to be transmitted from the coded keyboard 12 to the interface 49 and a computer 50 and from the computer 50 to the memory or buffer 13B for the cathode ray tube 13, is closed, such functions relating to the computer 50 as data input thereto, data retrieved therefrom and programming of the computer may not be performed.

In order to enable the operation of the computer 50 from the terminal 11A, an operator sitting at the coded keyboard 12 must properly activate one or more sensors, at least one of which is a sensor of a physical characteristic of the operator such as a microphone or other device. In FIG. 1, a microphone 15A is provided at the terminal, preferably although not necessarily, attached to the frame supporting the coded keyboard 12 and the cathode ray tube display 13 and at a location such that a person sitting at such keyboard may speak selected works into the microphone 15A so that analog audio signals will be generated on the output thereof, which extends to a computer or speech recognition processor 16 of conventional design.

The speech recognition processor-computer 16 is operable to process or digitize the analog speech signals generated on microphone output 15B and automatically analyze same by comparing the results with signals generated from a memory 19 in the processor. When the signals so analyzed match or otherwise compare with signals reproduced from the memory of the processor, which memory contains recordings or speech information from one or more persons authorized to operate the computer 50, a first signal is generated on one of a plurality of outputs 16A of the processor 16 and is applied to a particular circuit of a multiple input storage device 19 containing codes associated with different persons authorized to use the computer 50. Depending upon which of the outputs 16A of the processor 16 is activated, one of the codes stored in the storage device 19 is generated on its output 19A and is passed to the input 14D of the gate 14. When gate 14 is properly operated and closed, such code is passed to the computer 50 through the interface 49 and is recorded in the memory of the computer together with an indication of the time and date of such recording, as generated by either an internal clock associated with the computer circuits or an external clock connected to the computer. An indication of the information transmitted to the computer 50 from the coded keyboard 12 and received from the computer and displayed on the display screen of a cathode ray tube 13, is recorded in a special section of the memory of the computer 50 or an auxiliary memory located within or external of the computer so that an identification of the person operating the computer, the information such person enters into the computer and the information received from the computer as well as the date and time of day such information is generated or received, is had for future reference.

Gate 14 is normally open and thereby prevents the transmission of information to or from computer 50 with respect to terminal 11a. Gate 14A will close to pass information in both directions when the speech recognition processor-computer 16 recognizes the speech signals received as those generated by a person authorized to use the computer.

In addition to the speech signal on one of the outputs 16A for generating the described code identifying the person, a control signal on another output 16B activates a bistable switch or relay 16C. The output of switch 16C energizes one input of a logical AND circuit 17, which is maintained energized either for the duration of the time computer 50 is used by the person at the terminal or until a presence sensor 15S at terminal 11A senses the movement of such person away from the terminal.

Thus, gate 14 constitutes means for enabling the entering of entry data into computer 50 and the obtaining of output data from computer 50 in response to the control signal along output 16B when a person physically present at terminal 11A is identified by computer 16 as having authority to operate the computer system as described herein.

Presence sensor 15S may comprise a limit switch supported within the seat or cushion of terminal 11A and includes output 15SA, which extends to the other input of AND circuit 17, thereby generating an output signal on output 17A of AND circuit 17, which output 17A extends to the gate switching input 14E. Thus, as described, presence sensor 15S necessarily operates automatically without the physically present person having the choice to turn the system on as in conventional systems.

When so energized by the output signal on output 17A, gate 14 closes, thereby allowing information thereafter to be passed from the coded keyboard 12 to computer 50 and also allowing the code generated on the output of code generator 19, which is temporarily delayed in a delay element or relay 19D, to be passed to computer 50.

Also, when gate 14 is closed as described, information generated by computer 50 from its memory or from calculations performed thereby, may pass through such gate 14 with output 14C to input 13A of buffer 13B for the cathode ray tube display 13 and to be thereby generated as a still image of lines of alphanumeric characters or other information generated by computer 50.

Should the person sitting at the terminal 11A leave the vicinity of the terminal, the presence sensor 15S becomes deactivated causing the output of the AND circuit 17 to be terminated, and a control such as a logical NOT circuit or other contacts of the presence sensor switch 15S to become closed or activated so as to signal the microprocessor or computer 16 or directly control an input 14F of the switch or gate 14 to open the switch so that, should another person try to operate the terminal, such operation will not be possible until such other person is identified and properly positioned at the terminal as described.

Identification of the person seeking to use the computer 50 may be effected in a number of ways as described. Such person may also selectively operate switches of the keyboard 12 to generate a selected code or codes known only to such person of a limited number of persons. Such code or codes may be directly applied to close gate 14 or may be utilized to operate an auxiliary control means such as a coded relay or circuit for generating a signal on an input to the AND circuit 17 or other logical circuit receiving a signal, for example, from a presence sensor 15S. If the gate 14 is a bistable switch, it may be automatically caused to open when it receives a signal generated, for example, when it receives a signal generated, for example, when the person operating the terminal leaves the terminal as sensed by sensor 15S.

Memory 19 may also comprise an EPROM (erasable programmable read only memory) forming part of the speech signal recognition computer 16 and operable to generate a code signal identifying the person whose speech signals are recognized by such computer 50. The code identifying signal may be passed from memory 19 either directly to the computer 50 for recording therein along with signals indicative of the information entered into computer 50 by the selective operation of keyboard 12 or other means and of any information derived from the computer 50. However, such identifying code signal may be stored in an auxiliary memory such as another EPROM to be read therefrom whenever the keyboard 12 is operated thereafter and/or whenever queried by signals from computer 50, which may be programmed to identify sensitive information.

Figure 2:
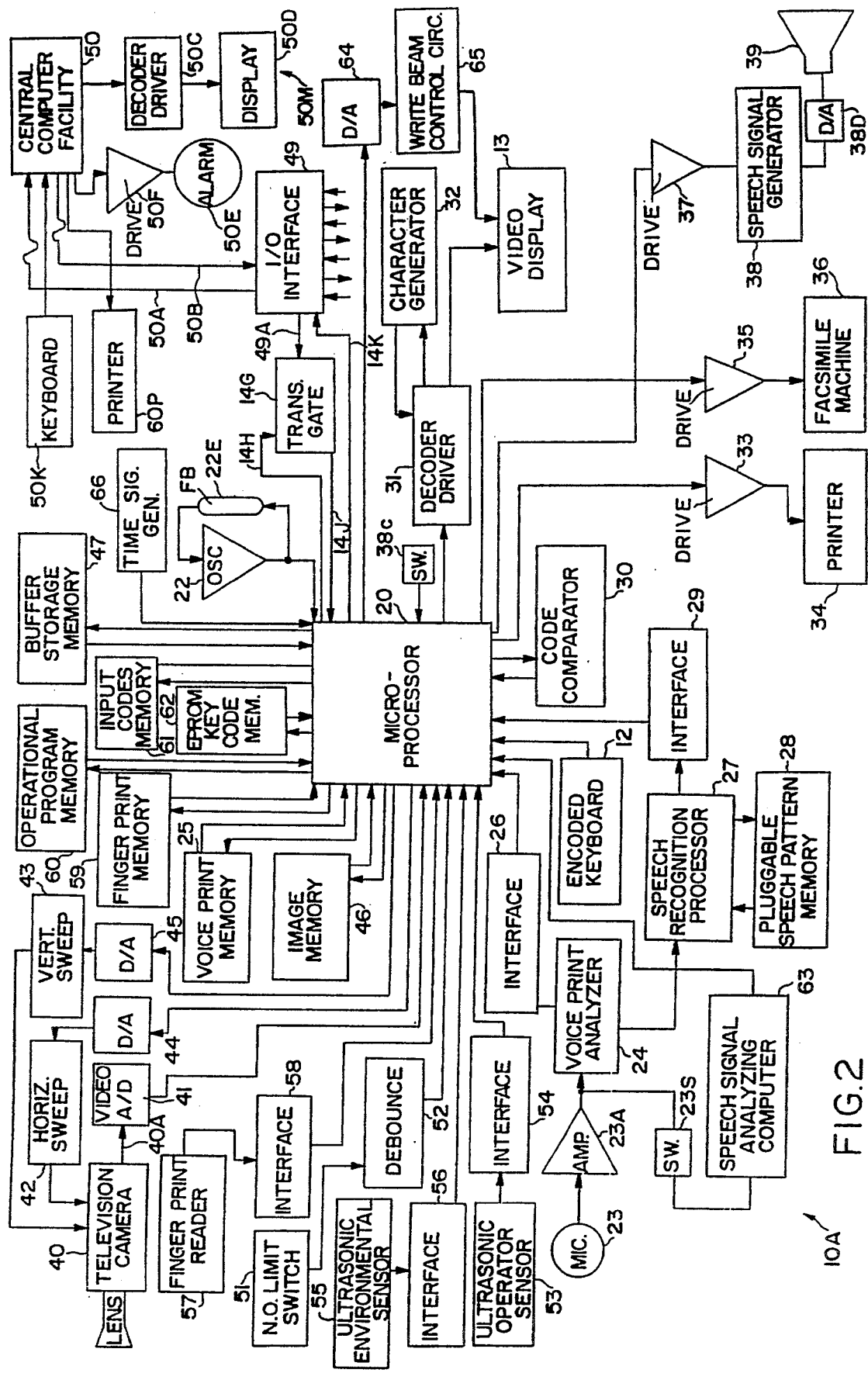
FIG. 2 is a more detailed schematic diagram of the computer security system defining the instant invention.

FIG. 2 shows greater details of a system 10A that is a modified form of system 10 of FIG. 1 and is operable for assuring computer operating security. In FIG. I a number of subsystems and discrete components are employed to enable the transmission of information to a computer 50 and the reception and display of information generated by the computer. However, in FIG. 2 a microprocessor or microcomputer 20 is programmed to control the transmission of data to and from a plurality of data storage and analyzing devices, the combination of which is operable to assure computer data security by identifying the person attempting to operate the terminal and input data into a local or remote computer, which may be time shared with other terminals and receive data from such remote computer. Means are also provided for generating an identifying code signal associated with the person so identified and recording such code signal either locally in a memory or within the memory of the computer along with information identifying the data transmitted to the computer and received from the computer. Thus, if it is necessary to indicate which of the person authorized to operate the terminal entered specific data in the computer memory and received specific data therefrom, such indicating function may be performed at one or more terminals of the system or at a central terminal or monitor station, which may be located near the computer.

The computer 50 may comprise a data processing computer, image or document information storage and retrieval computer, scientific information storage and retrieval computer or any type of computer that is operable to receive and/or disseminate information of a sensitive nature. One or more input lines 50A and output lines 50B extend to the computer for the transmission of data thereto from one or more terminals and the reception of data stored in the memory of the computer or generated by its computing circuits. A monitor station 50M includes a television display, such as a cathode ray tube 50D, which is driven and the display thereof maintained by a buffer 50C, which includes a decoder-driver and refresh memory. A manually operable keyboard 50K is also provided at the monitor station for two-way communication with the computer 50 and, although not illustrated, control means of the type which will be described to assure computer security at the terminals that communicate with the computer 50, may also be provided at the monitor station 50M.

An alarm 50E located at the monitor station 50M, which may be part of or attached to the video display 50D or keyboard 50K, is operable to alert a person at the monitor station of certain conditions that may exist at one or more of the terminals that are operable to communicate with the computer 50, enter data therein and receive data therefrom. Such a remote condition as an aborted attempt to communicate with the computer, a number of such attempts, the presence of a person at any of the terminals or the removal of such persons from a terminal, may be initially indicated by operation of the alarm 50E when its driver 50F is activated by a signal from the computer 50 and further details thereof may be derived by information transmitted from the computer 50 to the display 50D.

From multiple terminal operation, an input-output interface 49, as described, connects the circuits 50A and 50B to computer 50 directly with an output 14K of control microprocessor or computer 20 and interface output 49A to a transmission gate 14G having output 14J, which extends to microprocessor 20. Microprocessor 20 is clocked by signals from an oscillator 22 having an attendant feedback circuit 22E for stability.

The microprocessor 20 receives signals from a plurality of inputs including:

(a) a manual keyboard 12 with which the operator of the terminal may enter data into microprocessor 20 and by means of which the operator may receive data therefrom, such as data stored in the memory of microprocessor 20, an auxiliary memory controlled by microprocessor 20 or data deflating the results of computations performed by microprocessor 20.

To verify that the person sitting at the terminal is authorized to enter data into the computer 50 and to receive data from the computer 50 and permit such entry and retrieval and, further, to record such transactions and operations including the identification of the person at the computer terminal who is communicating with the computer and the date of such communications, the following input and output devices are employed by themselves or in combination:

(b) A microphone 23 is disposed convenient to the operator of the keyboard 12, such as integral therewith or adjacent thereto. To identify the operator, selected works are spoken by the operator into the microphone 23 and are amplified by an amplifier 23A, the output of which extends to an automatic voice-print analyzing circuit 24 and a speech recognition processor 27. Both circuit 24 and processor 27 have respective variable input devices such as voice print memory 25 and pluggable speech pattern memory 28, which are preferably locked and secured in a housing, such as the terminal housing, and may be changed with the changing of personnel who are authorized to use the computer 50.

An interface 26 receives the signal output of the analyzing circuit 24 and a second interface 29 receives the signals output from the speech processor 27, inputing such signals to the microprocessor 20 on respective circuits, for use thereby in comparing such outputs with signals derived from the voice-print memory 25 and the speech pattern memory 28. The computer and microprocessor 20 automatically determine if the person at the terminal, who is speaking the selected words into the microphone, is actually a person authorized to use the computer 50 from the analysis, which includes code signals transmitted by the microprocessor 20 to a code comparator 30. Upon positive identification of such person at the terminal by the analysis of the code signals output by the microprocessor 20, a switching or control signal is generated and transmitted from the microprocessor 20 to the transmission gate 14G via output 14H, which is controlled thereby to close and thereby permit the transmission of signals via output 49A of interface 49 from computer 50 to microprocessor 20 via gate 14G and output 14J. When received, such computer-generated signals may be used to activate respective drives 31, 33, 35 and 37 for a plurality of circuits.

Decoder driver 31 is operable for controlling display functions of a video display 13, which may be a cathode ray tube of the type described, adjacent or attached to a keyboard 12. Drives 33 and 35 are operable to respectively drive a hard copy printer 34 and a facsimile signal transmitter or machine 36. Drive 37 receives control signals for a synthetic speech signal generator 38 from the microprocessor 20, which generator 38 generates speech signals of works defining information received from the computer 50, which signals are converted from digital form as received to analog form in a digital-to-analog converter 38D, the output of which is connected to a speaker 39 for generating sounds of words indicating the data generated for the person at the terminal to hear.

A control switch 38C, preferably forming part of the keyboard 12, may be employed by the operator of the terminal to effect repeated reproduction of signals generated by the signal generator 38 and the regeneration of the same words on the output of the speaker 39 in the event that the operator requires such repeat to intelligibly determine the nature of the information so generated. In addition to generating sounds of words deflating information requested by the operator of the keyboard 12, instructions and commands generated by the central computer 50 associated with the operation of the keyboard 12 and other variables may also be transmitted to predeterminately operate the speech signal generator 38 and generate specific words on the output of the speaker for facilitating system operations.

A television camera 40, under control of signals generated on respective outputs of the microprocessor 20, is also employed to scan the face of the operator of the terminal including keyboard 12 and/or to scan document information to be processed and entered into the memory of the computer 50 as one or more full-frame video signals generated on the output 40A of the camera. Such analog video signals are converted to digital form in an analog-to-digital converter 41 and passed to the microprocessor 20 for storage in its video image memory 46 and/or for transmission to the computer 50 on output 14K extending to the interface 49, to be entered in the memory of the computer 50 for identifying the operator of the terminal in an on-line manner, for use in activating the display 50D to permit an operator of the monitor station 50M to view and identify an image of the face of the person at the terminal. Such video signal or signals generated on the output of the camera 40 may be stored in the memory of the computer 50 together with signals or codes that are indicative of the time of day and the information transmitted to and received from the computer by means which will be described.

To maintain images on the image screen of the cathode ray tube of the video display 13 of the terminal, a buffer memory 47, such as a magnetic disc or high density storage EPROM has input and output lines extending to and from the microprocessor 20. Display generating video signals derived from the computer 50, the video camera 40, the microprocessor 20 or generated by the selective operation of the keyboard 12, are input to the buffer memory 47 and temporarily stored therein for cyclically refreshing the display screen of the video terminal display 13. A character generating memory 32 receives signals from the microprocessor 20 through a decoder driver 31 as originally generated by the computer 50 or the selected operation of the keyboard 12 and provided by a key code memory 62 connected to the microprocessor 20. Such memory 62 may also be integral with the encoded keyboard 12 and may be utilized to generate a code or codes in accordance with signals received from the microprocessor 20 and generated by means other than the encoded keyboard 12.

Control of the write-beam of the cathode ray tube of the display 13 is effected, when needed, by signals generated as reproduced from part of the buffer-storage memory 47, which also generates deflection control digital signals for controlling operation of the scanning movement of the read-beam of the television camera 40, which signals are transmitted through the microprocessor to respective digital-to-analog converters 44 and 45, which are respectively connected to the horizontal and vertical sweep controls 42 and 43 of the camera 40.

Additional means as described are employed to identify the person at the terminal 11A who is seeking to operate the computer 50. Such additional means may be optionally provided in accordance with the degree and nature of the security required of the system and include a normally open limit switch 51, which may be closed by the weight of a person sitting at the computer terminal or standing on a pad adjacent to the display 13. The output of limit switch 51 is connected to a debounce circuit 52 to the microprocessor 20 and receives electrical energy, converted to a suitable voltage by conventional means, from a source of line current or power supply employed to provide such electrical energy for energizing the other components and subsystems illustrated.

An ultrasonic sensor 53 for sensing the presence of a person at the terminal 11A generates an output signal upon effecting such sensing, which signal is transmitted through an interface 54 to the microprocessor 20.

A second ultrasonic sensor 55 may be utilized to sense changes in the environment of the terminal 11A, such as the presence of one or more additional person thereat who may be able to receive and discriminate information generated by the video display 13, the printer 34, the facsimile machine 36 or the speech signal generator 38. The output of sensor 55 is transmitted to the microprocessor 20 through an interface 56 and may be utilized to open the transmission gate 14G, activate the alarm 50E or a separate alarm at the terminal 11A, effect the generation of speech signals on the output of a speech signal generator 38 that are indicative of such condition and warn the persons at the terminal that the computer may not be operated until the additional person or persons leave the vicinity of the terminal or effect their identification.

Thus, the combination of sensor 55 connected as described constitutes means including means for sensing a number of persons in the vicinity of computer terminal 11A, means for identifying each of such persons, means for generating a control signal upon failure to identify said number of persons and means for applying such control signal to prevent the operation of enabling transmission gate 14G to enable the obtaining of data from computer 50.

Still further identification of a person or person at the terminal 11A may be effected by means of a fingerprint reader 57 of conventional design, which includes electro-optical means for scanning the fingerprint of a person or persons presented to a scanning location and generating digital signals indicative of the fingerprint at an interface 58, which is connected to the microprocessor 20. A fingerprint signal containing memory 59 is also connected to the microprocessor 20 and, when queried by a signal therefrom, transmits signals reproduced from its memory to the microprocessor, which signals are compared in a comparison circuit of the code comparator 30 or a fingerprint signal recognition processor forming part of the memory of the microprocessor 20 or connected thereto.

It is noted that one or more of the described personal identification and indicating means connected to the microprocessor 20 may be utilized in a particular computer security system depending upon the particular requirements for security. A combination of the personal presence sensor or limit switch 51 and any of the described voice print analyzing, speech recognition, ultrasonic operator and environmental sensors, fingerprint scanner or any other sensing or scanning device that is operable to generate identification signals upon sensing a physical characteristic of the person at the terminal, may be utilized to generate information signals to be input to the microprocessor 20 and analyzed by circuits thereof or the circuits of one or more peripheral devices to permit the microprocessor to control the transmission gate, the display, printer and facsimile transmitter of information, the speech signal generator to generate speech indications of all or part of the information received from the computer 50 or local information generating devices.

An operational program memory 60 has input and output circuits connected to the microprocessor 20 for controlling its operation. An additional memory 61 is also provide for generating code signals such as codes identifying different persons authorized to operate the computer 50 from the terminal 11A. Memory 61 may be queried by signals from the microprocessor 20 to generate a code identifying such person, whenever required. The code may be recorded in a memory of the microprocessor, transmitted to a separate local memory or to the central computer 50 to be recorded in its memory adjacent signals that indicate the information transmitted to the computer by such operator and transmitted from the computer to the terminal 11A for activating the display 13, the printer 34, the facsimile machine 36 and/or the speech signal generator 38 as described.

A clock signal generator 66, connected to microprocessor 20, generates time code signals, which may be gated through microprocessor 20 to central computer 50 together with the code signals derived from memory 61 and indicative of the identification of the operator physically present at terminal 11A. Thus, both personal identification and time code signals are available for recording in the computer memory together with codes indicative of the information transmitted to and received from computer 50 by terminal 11A.

Such information may be derived from the memory of computer 50 and displayed on display 50D thereof or utilized to operate a hard copy printer 60P at the monitor station 50M to make it readily available to a person or persons monitoring the information entered into computer 50 and derived therefrom by any of a plurality of monitor stations and to determine at any time what information has been entered into computer 50 and received therefrom, the time of such entry or reception and the person entering or receiving the information.

Signals generated by microprocessor 20 and transmitted to computer 50 may also be indicative of the operation of printer 34, facsimile machine 36 and speech signal generator 38, which systems may be selectively controlled in their operation by the selective operation of keyboard 12. The coded keys of keyboard 12, which are operated to selectively transmit information from computer 50 to printer 34, facsimile machine 36 and speech signal generator 38, may also be operable to provide control signals for controlling microprocessor 20 to transmit code signals to computer 50 that are indicative of the operation of such peripheral devices and that may be recorded in the memory of computer 50 together with the code signals identifying the person operating the terminal.

Such capability with computer 50, display 50D, printer 60P, at monitor station 50M and its operation as described, necessarily constitutes electronically auditing the information entered into the computer system to determine errors therein. The information codes in the memory of computer 50 constitute control signals for reproduction of the information stored in computer 50 onto display 50D or printer 60P constituting visual presentation means making it possible to determine the person who entered specific information into the system including the entry of any erroneous information.

A speech signal analyzing computer 63 at terminal 11A is connected to receive speech signals generated by the microphone 23 when a switch 23S is manually closed. The speech signal synthesizing and recognition circuit 63 identifies specific words spoken into the microphone, such as verbal commands for predeterminately generating data to be entered into the computer 50 and controlling the operation of such computer from the terminal 11A as described. In other words, the speech analyzing circuits of the speech analyzing computer 63 may be used as an auxiliary means for entering data defined by words defining numbers and other speech spoken into the microphone 23 and for receiving selected information from the computer with or without the selective operation of the keys of the keyboard 12.

The terminal video display or cathode ray tube receiver 13 may be operated by signals from the decoder driver 31, which receives video signals from the character generator 32, which is activated by signals from the microprocessor 20 and by video signals derived by converting the video digital signals received from the buffer storage memory 47 and gated to a digital-to-analog converter 64, which is connected to a deflection and intensity control circuit associated with the CRT 13.

The speech signal analyzing computer 63 and the speech recognition processor 27 may be made in accordance with speech recognition devices and systems produced by such companies as Threshold Technology Inc. of Delran, N.J., Dialog Systems Inc. of Belmont, Mass. Scott Instruments of Denton, Tex. or others, it being noted that the electronic subsystems denoted 24, 25, 27 and 28 may form a single speech synthesizing and analysis computer obtainable from one of such companies. The speech signal generator computer 38 may be derived from or include components manufactured by such companies as Texas Instruments Corporation, Dallas, Tex., using their TNC 0820 or other speech synthesizing circuits, or speech synthesizers and speech generating computers manufactured by such companies as Telesensory Systems Inc. of Palo Alto, Calif., Votrax Division, Federal Screw Works of Troy, Mich., Periphonics of Bohemia, N.Y., Interstate Electronics of Anaheim, Calif. and others. The synthetic speech processor 27 and analyzer 24, for example, may comprise the Threshold 500 voice recognition computer or the like.

It is noted that the described data security system or a part thereof may be utilized as a guard against theft or improper operation of other forms of accounting machines such as cash registers and other cash or article dispensing machines. For example, personal and presence identification means as described in combination with a computer or microprocessor and electronic circuit elements and subsystems as described may be employed to permit or enable the operation of a cash register or the like, wherein transactions performed are recorded in a memory such as a microprocessor memory or on a record member that is not dispensed to a customer, together with a code associated with the operator of the cash register, wherein such code may be generated by any of the means described used per se or in combination. Such a personal identification code, for example, may be generated when the user of the cash register depresses or activates a sensing means including a push-button switch, wherein the finger causing such switch activation is photoelectrically scanned as accomplished by known radiation receiving means and the resulting signals are processed to generate the code and, in certain instances, analyzed to enable operation of the register. If the code identifying the person operating the register is recorded with each transaction, wherein the latter includes the amount of the transaction, then errors which are thereafter detected may be attributed to the person or persons using the cash register. A microphone and electronic circuits as described for analyzing voice signals of words spoken by a person using the register may also be employed to generate user identifying codes and enable operation of the register.

It should be understood, with respect to all of the embodiments illustrated and described above, that the power supplies having the correct polarities and magnitudes are provided, where not indicated in the drawings, so as to supply proper electrical energy for appropriately operating the various illustrated circuits as described in the specification and in a manner to properly perform the functions described.

I claim:

1. A security system for a machine comprising:
   (a) an operating station including means for allowing a human operator to operate and control a machine from said operating station;
   (b) means for attempting to identify a person seeking to operate the machine;
   (c) means for automatically generating a control signal when the identification means confirms the identity of a person authorized to operate the machine;
   (d) means for applying the control signal to the operating station to permit the authorized person to activate the operating station and act as operator of the machine from the operating station;
   (e) means for detecting entry to and departure from a select area in the vicinity of the operating station by any person and for automatically generating a sisal upon said detection; and
   (f) means coupled to the detection means and to the operating station for deactivating the operating station when the detection means has generated a signal, thereby indicating that the select area does not contain only the operator.

2. A system in accordance with claim 1 wherein the operating station comprises means for inputting and outputting information from a digital computer.

3. A system in accordance with claim 2 wherein the operating station includes a computer keyboard.

4. A system in accordance with claim 1 wherein the identification means includes a video analysis system including:
   (a) means for sensing at least one physical characteristic of the person and automatically generating electronic codes related to said sensed characteristics;
   (b) means for storing codes defining a plurality of sets of physical characteristics, each set relating to a person authorized to operate the machine; and
   (c) means for comparing the codes derived from the sensing means with the stored codes representative of the characteristics of authorized persons.

5. A system in accordance with claim 4 wherein the video analysis system includes:
   (a) a television camera positioned so as to scan the face of the person seeking to operate the machine;
   (b) means for automatically controlling the television camera to effect a full-frame scan of the face of the person, and for generating a video signal containing information defining the image of the face of said person on an output of the camera;

(c) means for requesting identifying information be input by a human;

(d) means for recording said inputted identifying information and said video signal information output by the camera in an associated relationship;

(e) means for selectively reproducing video signal information and associated identifying information from the recording means;

(f) means for comparing said reproduced information with the information on the output of the camera; and (g) means for logging said identifying information to maintain records of persons operating the machine.

6. The apparatus of claim 5 further comprising means for generating date and time codes and for logging said codes with said identifying information.

7. A system in accordance with claim 1 wherein the identification means includes a speech analysis system including:

(a) a microphone;

(b) means for converting speech spoken into the microphone into electrical speech signals;

(c) means for analyzing selected characteristics of the electrical speech signals;

(d) means for storing a plurality of signals, each representative of a person authorized to operate the machine; and (e) means for comparing the analyzed characteristics with the stored signals.

8. A security system for a machine comprising:

(a) an operating station including means for allowing a human operator to operate and control a machine;

(b) means for attempting to identify a person seeking to operate the machine;

(c) means for automatically generating a control signal when the identification means confirms the identity of a person authorized to operate the machine;

(d) means for applying the control signal to permit the authorized person to activate the operating station and act as operator of the machine from the operating station;

(e) means for detecting departure of the operator from a predetermined area around the operating station and for automatically generating a signal upon said detection; and (f) means coupled to the detection means and to the operating station for deactivating the operating station when the detection means has generated a signal, thereby indicating that the operator is no longer within said predetermined area.

9. A system in accordance with claim 8 wherein the operating station comprises means for inputting and outputting information from a digital computer.

10. A system in accordance with claim 9 wherein the operating station includes a computer keyboard.

11. A system in accordance with claim 8 further comprising means for requesting that identifying information be input by a human, and wherein the identification means includes:

(a) means for obtaining and recording at least one personal physical characteristic code;

(b) means for recording said inputted identifying information code and said personal physical characteristic in an associated relationship;

(c) means for selectively reproducing said personal physical characteristic code and associated identifying information code from the recording means; and (d) means for comparing said reproduced information code with the information code on the output of said means for obtaining at least one personal physical characteristic code.

12. A system in accordance with claim 8 further comprising means for logging said identifying information code to maintain records of persons operating the machine.

13. A system in accordance with claim 8 wherein:

(a) said operating system includes a seat for the operator; and (b) said detecting means comprises a switch that is operated when a person sits in the seat.

14. A system in accordance with claim 8 wherein said detecting means includes means for receiving radiation when a person is in said predetermined area.

15. A system in accordance with claim 8 wherein said detecting means includes an ultrasonic sensor operable to sense the physical presence of a person in said predetermined area.

16. A system in accordance with claim 8 including an AND logic circuit connected to said identifying means and said detecting means, said circuit operable to generate a control signal when a person is both identified as authorized and physically present at the operating station.

17. A security system in accordance with claim 8:

(a) further comprising means for requesting that an identification code be input by a human;

(b) wherein the identification means includes:

(i) means for obtaining personal characteristic information and automatically generating at least one personal physical characteristic code therefrom, (ii) means for recording a personal identifying code and said personal physical characteristic code in an associated relationship, (iii) means for selectively reproducing said personal physical characteristic code and associated identifying code from the recording means, (iv) means for comparing said reproduced identifying code with the inputted identification code, and (v) means for automatically comparing a personal physical characteristic code obtained from said person seeking to operate the machine with reproduced personal physical characteristic codes; and (c) further comprising means for logging said identifying information code to maintain records of persons operating the machine.

18. A security system for a machine comprising:

(a) a terminal configured to allow a human operator to operate and exchange information with a machine;

(b) a personal-identification system configured to automatically generate on its output a first electronic control signal when a person authorized to operate the machine is situated adjacent to the terminal;

(c) a detector situated to generate on its output a second control signal when the person departs a select vicinity of the terminal; and (d) a control circuit coupled to the terminal and the outputs of (b) and (c) and configured to apply the two control signals to permit the person to activate and act as operator of the terminal when the personal-identification system has issued the first control signal and the detector has not issued the second control signal.

19. A system in accordance with claim 18:

(a) further comprising a second detector situated to generate on its output a third control signal when another person besides the operator enters said select vicinity; and (b) wherein aid control circuit is coupled to the output of the second detector and configured, upon receipt of the third control signal, to: (i) suspend operation of said terminal, (ii) then activate said personal-identification system to attempt to identify said another person as authorized, and (iii) then resume operation of said terminal only upon receipt of a first control signal associated with another person who is authorized to operate the machine.

20. A security system in accordance with claim 18:

(a) further comprising an input device configured to request that an identification code be input by a human;

(b) wherein the personal-identification system comprises:

(i) a sensor configured to generate signals representative of at least one personal physical characteristic of a person, (ii) a recording member containing identifying codes and personal physical characteristic information in an associated relationship for at least one authorized person, (iii) a transducer situated to selectively reproduce said personal physical characteristic information and associated identifying code from the recording member, (iv) a first comparator that compares said reproduced identifying code with the inputted identification code, and (v) a second comparator that compares said reproduced personal physical characteristic information with signals outputted by said sensor representative of personal physical characteristics of a person situated adjacent to the terminal, wherein said personal-identification system generates said first electronic control signal when both of said comparators indicate a match; and (c) further comprising means for logging said identifying information code to maintain records of persons operating the machine.

21. A system in accordance with claim 18 wherein said detector is coupled to re-activate said personal-identification system after a time.

22. A method of securing a machine comprising:

(a) attempting automatic identification of a person seeking to operate and control a machine from an operating station;

(b) generating a first electronic signal upon confirming the identity of a person who is authorized to operate the machine;

(c) applying the first signal to the operating station to permit the authorized person to activate the operating station and act as operator of the machine from the operating station;

(d) automatically detecting entry to and departure from a select area in the vicinity of the operating station by another person and generating a second electronic signal upon said detection; and (e) applying the first and second signals to control the operating station to allow the operator to operate the operating station only when the first signal has been generated, but not the second, thereby indicating that the select area contains only the operator.

23. A method in accordance with claim 22 wherein the operating station comprises a terminal coupled to a digital computer.

24. The method in accordance with claim 22 further comprising logging information identifying said person upon generation of said first signal, thereby maintaining records of the identity of persons operating the machine.

25. A method in accordance with claim 22 wherein attempting automatic identification includes:

(a) sensing at least one physical characteristic of the person and automatically generating electronic codes related to said sensed characteristics;

(b) storing in an electronic memory codes defining a plurality of sets of physical characteristics, each set relating to a person authorized to operate the machine; and (c) comparing the codes related to the sensed characteristics with the stored codes representative of the characteristics of authorized persons.

26. A method in accordance with claim 25 wherein attempting automatic identification further comprises:

(a) pre-recording identifying information for each authorized person in an associated relationship with said codes defining the set of personal physical characteristics related to that person;

(b) requesting that identifying information be input by each person seeking to activate the operating station;

(c) selectively reproducing said personal physical characteristic codes with said associated identifying information;

(d) comparing said reproduced identifying information with the inputted information; and (e) confirming the identity of a person seeking to activate the operating station only if the inputted information matches the reproduced identifying information and the sensed physical characteristics match the stored codes related to the physical characteristics of a person who is authorized to activate the operating station.

* * * * *